United States Patent

[11] 3,607,046

| [72] | Inventors | Charles M. Little;<br>Richard A. Murie, both of Warren, Mich. |
|---|---|---|
| [21] | Appl. No. | 757,110 |
| [22] | Filed | Sept. 3, 1968 |
| [45] | Patented | Sept. 21, 1971 |
| [73] | Assignee | General Motors Corporation<br>Detroit, Mich. |

[54] PREPARATION OF ALUMINUM NITRIDE
3 Claims, No Drawings

[52] U.S. Cl. .................................................. 23/192
[51] Int. Cl. ............................................... C01b 21/06
[50] Field of Search .................................... 23/89, 191, 192

[56] References Cited
UNITED STATES PATENTS

| 1,079,974 | 12/1913 | Bucher | 23/191 X |
| 3,087,782 | 4/1963 | Whaley | 23/89 |
| 3,189,412 | 6/1965 | Wood et al. | 23/191 |
| 3,261,666 | 7/1966 | Luberoff et al. | 23/191 |
| 3,307,908 | 3/1967 | Mandorf | 23/192 |

FOREIGN PATENTS

| 784,126 | 10/1957 | England | 23/192 |

Primary Examiner—Oscar R. Vertiz
Assistant Examiner—Charles B. Rodman
Attorneys—Peter P. Kozak, George A. Grove and William S. Pettegrew ABSTRACT: Aluminum nitride is formed in a reaction conducted at about normal atmospheric pressure by bringing together pure aluminum and a small amount of lithium under dry conditions and heating these two metals in the presence of nitrogen. In a preferred embodiment the reaction system is heated to a temperature of about 400° C. to 1,100° C. whereby nitrogen reacts with lithium to form lithium nitride which, in turn, readily reacts with aluminum to form lithium and the desired aluminum nitride. Since under suitable reaction conditions lithium is regenerated so long as unreacted aluminum is present, only a substantially catalytic amount of lithium is employed.

PREPARATION OF ALUMINUM NITRIDE

The subject invention relates to the synthesis of aluminum nitride. More particularly, the invention relates to an inexpensive, low-pressure method of forming relatively pure aluminum nitride in good yield from aluminum, nitrogen and a small amount of lithium.

Aluminum nitride (AlN) is a hard, nonconductive material having covalent bonding between the aluminum and nitrogen atoms. Because of their good chemical and heat stability, as well as stability to changes in temperature, sintered parts made of aluminum nitride have been used, or proposed for use, in nozzles, thermocouple-protecting tubes, crucibles and insulators in certain fuel cell systems such as the lithium/$Cl_2$ system. Aluminum nitride may be formed by the direct reaction between aluminum and nitrogen. However, this reaction typically requires very high temperatures and high pressure which conditions are relatively expensive to obtain and maintain. It is also known that aluminum nitride is formed as a relatively impure intermediate product in one of the processes for making aluminum carbide. In fact, all of the known techniques for synthesizing aluminum nitride are expensive, considering the cost of the starting materials, and/or do not produce a pure product.

It is an object of the present invention to provide a novel, high yield, atmospheric pressure synthesis of substantially pure aluminum nitride.

It is a more specific object of the present invention to provide a method of synthesizing aluminum nitride wherein a catalytic amount of lithium is successively and repeatedly reacted with nitrogen and aluminum to substantially completely convert a large amount of aluminum to aluminum nitride.

In accordance with a preferred embodiment of our invention, these and other objects are accomplished by bringing together about 100 parts of high-purity aluminum and about one-half to three parts of lithium under dry conditions. The aluminum and lithium are heated in a suitable container such as an aluminum nitride or molybdenum crucible to a temperature in the range of about 400° C. to 1,100° C. and subjected to dry nitrogen. Typically, under these conditions a readily detectable chemical reaction takes place whereby lithium nitride is formed and rapidly decomposed by the aluminum to form aluminum nitride and lithium. The regenerated lithium continues to react with available nitrogen to repeatedly form lithium nitride which in turn is decomposed so long as aluminum is available for reaction. At the completion of the reaction, if desired, residual lithium or lithium nitride may be removed from the reaction product. This is accomplished, for example, by selectively chlorinating the lithium to form lithium chloride and subsequently leaching out lithium chloride with methyl alcohol or other suitable solvents. Typically substantially pure aluminum nitride in 95 percent–100 percent yield is obtained by our process.

We have found that, in the absence of lithium, nitrogen and aluminum alone do not react to form pure aluminum nitride under the above defined conditions.

A specific example of our synthesis of aluminum nitride will serve to more completely describe the invention. Fifty grams of 99.99+ percent pure aluminum and 1½ grams of lithium metal were loaded into a molybdenum crucible in a dry box. The aluminum was in the form of chips roughly ½ inch ×½ inch ×60 mils in size. The lithium employed was obtained by cutting the desired amount from a block of solid lithium. The aluminum was dropped into the crucible and the lithium placed on top. A rubber stopper was inserted into the top of the crucible and the container removed from the dry box. The crucible was placed into a 2-inch-diameter quartz test tube, the crucible resting on a small alumina plate at the bottom of the tube. The quartz tube was purged with argon and the rubber stopper was removed from the molybdenum crucible. A two-hole stopper was placed in the top of the test tube (adapted to receive an inlet tube and an exhaust tube). Dry argon was passed into the quartz test tube and permitted to flow out of the tube through a dry trap and subsequently up through a 6-inch column of kerosene contained in a test tube. Thus, a slight positive pressure within the quartz test tube of about 6 inches of kerosene was maintained. The contents of the quarts test tube were heated to a temperature of about 900° C. When a temperature of 555° C. was reached, nitrogen flow was commenced and argon flow ceased. The temperature within the molybdenum crucible was maintained at 900° C. for about 4 hours before any reaction was noted. The lithium did not appear to melt, but it did darken, which may have been indicative of lithium nitride formation. After about 4 hours at 900° C. it becomes apparent that some nitrogen was being consumed by the reactants. Back pressure was noted in the kerosene bubbler and there appeared to be a "fire" in the crucible. The visual manifestations of chemical reaction lasted about 30 minutes, during which time the maximum noted temperature was 950° C. The system was held at 850° C.–870° C. for an additional 40 minutes at which time the nitrogen was turned off and argon turned on. After an additional 45 minutes the heat was turned off and the crucible allowed to slowly cool under an argon atmosphere.

The reaction mass was subsequently chlorinated by reaction with chlorine gas at one atmosphere and 700° C. for 1½hours to convert the small amount of lithium nitride and/or lithium to lithium chloride. After recooling the chlorinated reaction mass to room temperature, the product was washed with methyl alcohol to remove the lithium chloride and then dried. Based on the weight of the purified reaction product, the apparent conversion of aluminum to aluminum nitride was 97 percent. A specimen was taken for X-ray diffraction analysis and comparison of its X-ray diffraction pattern with patterns of specimens of aluminum nitride. Based on the synthesis and the X-ray diffraction analysis the product was conclusively identified as aluminum nitride. Moreover, from the study of the X-ray diffraction pattern it appeared that the aluminum nitride produced by our method was of high purity.

While it is known that substantially stoichiometric amounts of lithium nitride may be reacted under suitable conditions with aluminum to form lithium and aluminum nitride, we have found that in accordance with the procedures described above only small but effective catalytic amounts of lithium, preferably one-half percent to 3 percent by weight based on the aluminum employed, need not be used. An obvious advantage of our method is that our desired product, aluminum nitride, is not contaminated with a large amount of lithium.

In the experiment described above, chips of aluminum and lithium were employed. More finely divided particles of either or both of the constituents may be employed for the synthesis, in which case the reaction generally proceeds more rapidly. In general, aluminum nitride may be formed in accordance with our method by reaction of aluminum and lithium and nitrogen preferably at temperatures of about 400° C.–1,100° C. and at about normal atmospheric pressure. Once the reaction is initiated at these temperatures, aluminum is rapidly converted in greater than 95 percent yield to aluminum nitride within a period of a few minutes to a couple of hours.

Aluminum nitride formed in accordance with our invention may be converted into useful articles, such as those set forth above, by more or less conventional powder metallurgical techniques. Particles of the aluminum nitride are hot pressed into an article of predetermined configuration.

While our invention has been described in terms of a specific embodiment thereof, it will be appreciated that other forms could readily be adapted by one skilled in the art and therefore the scope of the invention should be considered limited only by the following claims.

We claim:

1. A method of synthesizing aluminum nitride comprising bringing together 100 parts by weight of substantially pure aluminum and from about one-half to about three parts by weight of lithium in a dry environment, heating said lithium and said aluminum in the presence of dry nitrogen at about normal atmospheric pressure and at a temperature of about 400° C. to 1,100° C. for a suitable period whereby said lithium is repeatedly and successively converted to lithium nitride by reaction with said nitrogen and back to lithium by the reaction of said aluminum with lithium nitride, said aluminum ultimately being converted thereby to aluminum nitride, and then cooling the reaction product to below 400° C.

2. A method of synthesizing aluminum nitride comprising preparing a mixture of about 100 parts by weight aluminum and from about one-half to three parts by weight lithium in a dry environment, heating said mixture at a temperature in the range of about 400° C. to 1,100° C. in the presence of dry nitrogen at about normal atmospheric pressure for a suitable period until no additional nitrogen is consumed by the reaction mixture and then cooling the reaction mixture below said temperature range, whereby said aluminum is converted to aluminum nitride.

3. A method of synthesizing aluminum nitride comprising preparing a mixture of about 100 parts by weight aluminum and from about one-half to three parts by weight lithium in a dry environment, heating said mixture at a temperature in the range of about 400° C. to 1,100° C. in the presence of dry nitrogen at about normal atmospheric pressure until such time as no additional nitrogen is consumed by the reaction mixture, chlorinating said reaction mixture so as to convert any lithium or lithium nitride to lithium chloride, cooling the chlorination reaction mixture to a suitable temperature below said temperature range and extracting said lithium chloride from said chlorination reaction mixture with a solvent, the nonextracted residue being substantially pure aluminum nitride.